(12) United States Patent
Horstman

(10) Patent No.: US 10,030,357 B1
(45) Date of Patent: Jul. 24, 2018

(54) VEHICLE SPEED CONTROL BASED ON GRADE ERROR

(71) Applicant: DEERE & COMPANY, Moline, IL (US)

(72) Inventor: Nathan J. Horstman, Durango, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/413,498

(22) Filed: Jan. 24, 2017

(51) Int. Cl.
| | |
|---|---|
| *E02F 3/76* | (2006.01) |
| *E02F 3/84* | (2006.01) |
| *E02F 9/20* | (2006.01) |
| *F02D 41/26* | (2006.01) |
| *F02D 9/08* | (2006.01) |
| *F02D 41/00* | (2006.01) |

(52) U.S. Cl.
CPC ............. *E02F 3/84* (2013.01); *E02F 3/7636* (2013.01); *E02F 9/202* (2013.01); *E02F 9/2066* (2013.01); *E02F 9/2079* (2013.01); *F02D 9/08* (2013.01); *F02D 41/0002* (2013.01); *F02D 41/26* (2013.01); *F02D 2200/501* (2013.01); *F02D 2200/702* (2013.01)

(58) Field of Classification Search
None
See application file for complete search history.

(56) References Cited

U.S. PATENT DOCUMENTS

| | | | | |
|---|---|---|---|---|
| 4,402,368 | A * | 9/1983 | Moberly | ............... E02F 3/7663 |
| | | | | 172/4.5 |
| 4,923,015 | A | 5/1990 | Barsby et al. | |
| 7,121,355 | B2 | 10/2006 | Lumpkins et al. | |
| 8,401,751 | B2 | 3/2013 | Jacobson et al. | |
| 8,473,166 | B2 | 6/2013 | Zhdanov et al. | |
| 8,676,474 | B2 | 3/2014 | Peterson et al. | |
| 8,924,098 | B2 | 12/2014 | Zhdanov et al. | |
| 2002/0162668 | A1* | 11/2002 | Carlson | ................... E02F 3/847 |
| | | | | 172/4.5 |
| 2003/0221845 | A1* | 12/2003 | Takahashi | ............. E02F 9/2246 |
| | | | | 172/3 |
| 2008/0243345 | A1* | 10/2008 | Knight | ..................... E02F 3/84 |
| | | | | 701/50 |
| 2011/0276236 | A1 | 11/2011 | Shimada | |

* cited by examiner

*Primary Examiner* — Justin Holmes
(74) *Attorney, Agent, or Firm* — Taft Stettinius & Hollister LLP; Stephen F. Rost

(57) ABSTRACT

A grade control system for a motor grader configured to adjust the speed of the motor grader based on a difference between a desired grade and a current grade. The difference between the desired grade and the current grade provides a current error signal which is compared to a predetermined acceptable error signal or a predetermined range of acceptable error signals. If the current error signal is outside the range of acceptable error signals, the vehicle is automatically slowed down. If the vehicle is within the range of acceptable error signals, the vehicle speed either remains the same or the vehicle speed is increased to improve productivity, while maintaining the current error signal within the range of acceptable error signals. The desired grade is provided to an electronic control unit resident on the grader from either a 2D cross slope machine control system or a 3D machine control system.

20 Claims, 3 Drawing Sheets

VEHICLE SPEED CONTROL BASED ON GRADE ERROR

FIELD OF THE DISCLOSURE

The present disclosure relates to a motor grader for grading a surface, and in particular to controlling the speed of the motor grader based on a desired grade of the surface.

BACKGROUND

Work vehicles, such as a motor grader, can be used in construction and maintenance for creating a flat surface at various angles, slopes, and elevations. When paving a road for instance, a motor grader can be used to prepare a base foundation to create a wide flat surface for to support a layer of asphalt. A motor grader can include two or more axles, with an engine and cab disposed above the axles at the rear end of the vehicle and another axle disposed at the front end of the vehicle. A blade, also called a moldboard, is attached to the vehicle between the front axle and rear axle.

Motor graders include a drawbar assembly attached near the nose of the grader which is pulled by the grader as it moves forward. The drawbar assembly rotatably supports a circle drive member at a free end of the drawbar assembly and the circle drive member supports a work implement such as the blade, also known as a mold board. The angle of the work implement beneath the drawbar assembly can be adjusted by the rotation of the circle drive member relative to the drawbar assembly.

In addition, to the blade being rotated about a rotational fixed axis, the blade is also adjustable to a selected angle with respect to the circle drive member. This angle is known as blade slope. The elevation of the blade is also adjustable.

To properly grade a surface, the motor grader includes a plurality of sensors which measure the orientation of the vehicle with respect to gravity and the location of the blade with respect to the vehicle. A rotation sensor located at the circle drive member provides a rotational angle of the blade with respect to a longitudinal axis defined by a length of the vehicle. A blade slope sensor provides a slope angle of the blade with respect to a lateral axis which is generally aligned with a vehicle lateral axis, such as defined by the vehicle axles. A mainfall sensor provides an angle of travel of the vehicle with respect to gravity.

Machine control systems, which include 2 dimensional (2D) and 3 dimensional (3D) machine control systems, are located at the surface being graded to provide grade information to the motor grader. A vehicle grade control system receives signals from the machine control system to enable the motor grader to grade the surface. The motor grader includes a grade control system operatively coupled to each of the sensors, so that the surface being graded can be graded to the desired slope, angle, and elevation. The desired grade of the surface is planned ahead of or during a grading operation.

Machine control systems can provide slope, angle, and elevation signals to the vehicle grade control system to enable the motor grader or an operator to adjust the slope, angle, and elevation of the blade. The vehicle grade control system can be configured to automatically control the slope, angle, and elevation of the blade to grade the surface based on desired slopes, angles, and elevations as is known by those skilled in the art. In these automatic systems, adjustments to the position of the blade with respect to the vehicle are made constantly to the blade in order to achieve the slope, angle and/or elevation targets. Many vehicle grade control systems offer an included or optional display that indicates to the operator how well the vehicle grade control system is keeping up to the target slope, angle, and/or elevation. These displays are called "light bars" in the trade. The operator uses the feedback from the light bars to adjust vehicle speed if desired. The operator, however, may not be sufficiently skilled, for instance due to lack of experience, in making adjustments to vehicle speed. Errors in grading the surface to the desired grade can result.

Therefore, a need exists for a controlling the vehicle speed based on the desired surface grade.

SUMMARY

In one embodiment of the present disclosure, there is provided a method of controlling a speed of a grading vehicle during a grading operation to grade a surface to a desired grade. The method includes the steps of: establishing a grade target to establish the desired grade of the surface; identifying a current grade of the surface; identifying an error value between the grade target and the identified current grade of the surface; increasing the speed of the grading vehicle if the identified error value is too small; and decreasing the speed of the grading vehicle if the identified error value is too large.

In another embodiment of the present disclosure, there is provided a control system for a vehicle having wheels, a frame, a grader blade configured to move through a range of positions with respect to the frame, and an engine supported by the frame to move the vehicle at a requested speed, and a transmission having a plurality of selectable gears operatively connected to the engine and to the wheels. The control system includes a throttle having a throttle output, the throttle operatively connected to the engine to adjust a speed of the engine with the throttle output. Control circuitry is operatively connected to the throttle. The control circuitry includes a processer and a memory. The memory is configured to store program instructions and the processor is configured to execute the stored program instructions to: identify a current grade of the surface; identify an error value between a grade target and the identified current grade of the surface; increase the speed of the vehicle with the throttle output or by selecting a gear of the transmission if the identified error value is too small; and decrease the speed of the vehicle with the throttle output or by selecting a gear of the transmission if the identified error value is too large.

In still another embodiment of the present disclosure, there is provided a method of controlling a speed of a grading vehicle during a grading operation to grade a surface to a desired grade. The method includes the steps of identifying a current grade of the surface; identifying an error value between a grade target and the identified current grade of the surface; increasing the speed of the grading vehicle if the identified error value is within a range of acceptable error values; and decreasing the speed of the grading vehicle if the identified error value is outside the range of error values.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
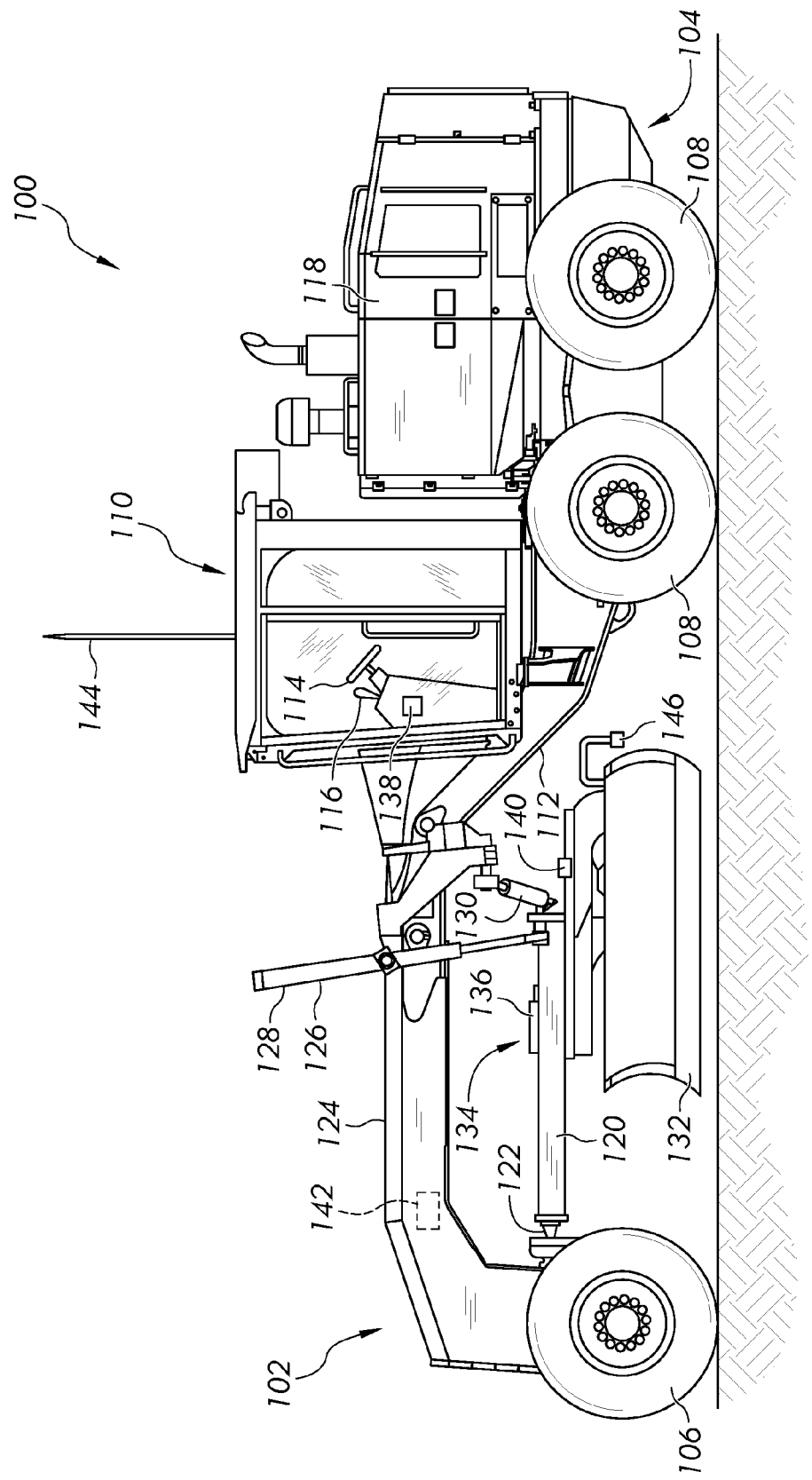
FIG. 1 is a side view of a motor grader.

Referring to FIG. 1, an exemplary embodiment of a vehicle, such as a motor grader 100, is shown. An example of a motor grader is the 772G Motor Grader manufactured and sold by Deere & Company. As shown in FIG. 1, the motor grader 100 includes front frame 102 and rear frame 104, with the front frame 102 being supported on a pair of front wheels 106, and with the rear frame 104 being supported on right and left tandem sets of rear wheels 108. An operator cab 110 is mounted on an upwardly and forwardly inclined rear region 112 of the front frame 102 and contains various controls for the motor grader 100 disposed so as to be within the reach of a seated or standing operator. In one aspect, these controls may include a steering wheel 114 and a lever assembly 116. An engine 118 is mounted on the rear frame 104 and supplies power for all driven components of the motor grader 100. The engine 118, for example, is configured to drive a transmission (not shown), which is coupled to drive the rear wheels 108 at various selected speeds and either in forward or reverse modes. A hydrostatic front wheel assist transmission (not shown), in different embodiments, is selectively engaged to power the front wheels 106, in a manner known in the art.

Mounted to a front location of the front frame 102 is a drawbar or draft frame 120, having a forward end universally connected to the front frame 102 by a ball and socket arrangement 122 and having opposite right and left rear regions suspended from an elevated central section 124 of the front frame 102. Right and left lift linkage arrangements including right and left extensible and retractable hydraulic actuators 126 and 128, respectively, support the left and right regions of the drawbar 120. The right and left lift linkage arrangements 126 and 128 either raise or lower the drawbar 120. A side shift linkage arrangement is coupled between the elevated frame section 124 and a rear location of the drawbar 120 and includes an extensible and retractable side swing hydraulic actuator 130. A blade or mold board 132 is coupled to the front frame 102 and powered by a circle drive assembly 134.

The drawbar 120 is raised or lowered by the right and left lift linkage arrangements 126 and 128 which in turn raises or lowers the blade 132 with respect to the surface. The actuator 130 raises or lowers one end of the blade 132 to adjust the slope of the blade.

The circle drive assembly 134 includes a rotation sensor 136, which in different embodiments, includes one or more switches that detect movement, speed, or position of the blade 132 with respect to the vehicle front frame 102. The rotation sensor 136 is electrically coupled to a controller 138, which in one embodiment is located in the cab 110. In other embodiments, the controller 138 is located in the front frame 102, the rear frame 104, or within an engine compartment housing the engine 118. In still other embodiments, the controller 138 is a distributed controller having separate individual controllers distributed at different locations on the vehicle. In addition, while the controller is generally hardwired by electrical wiring or cabling to sensors and other related components, in other embodiments the controller includes a wireless transmitter and/or receiver to communicate with a controlled or sensing component or device which either provides information to the controller or transmits controller information to controlled devices.

A slope sensor 140 is configured to detect the slope of the blade 132 and to provide slope information to the controller 138. In different embodiments, the slope sensor 140 is coupled to a support frame for the blade 132 of the hydraulic actuator 130 to provide the slope information. A mainfall sensor 142 is configured to detect the grading angle of the vehicle 100 with respect to gravity and to provide grading angle information to the controller 138.

An antenna 144 is located at a top portion of the cab 110 and is configured to receive signals from different types of machine control systems including sonic systems, laser systems, and global positioning systems (GPS). While the antenna 144 is illustrated, other locations of the antenna 144 are included as is known by those skilled in the art. For instance, when the vehicle 100 is using a sonic system, a sonic tracker 146 is used detect reflected sound waves transmitted by the sonic system through with the sonic tracker 146. In a vehicle 100 using a laser system, a mast (not shown) located on the blade supports a laser tracker located at a distance above the blade 132. In one embodiment, the mast includes a length to support a laser tracker at a height similar to the height of a roof of the cab. A GPS system includes a GPS tracker located on a mast similar to that provided for the laser tracker system. Consequently, the present disclosure applies vehicle motor grader systems using both relatively "simple" 2D cross slope systems and to"high end" 3D grade control systems.

Figure 2:
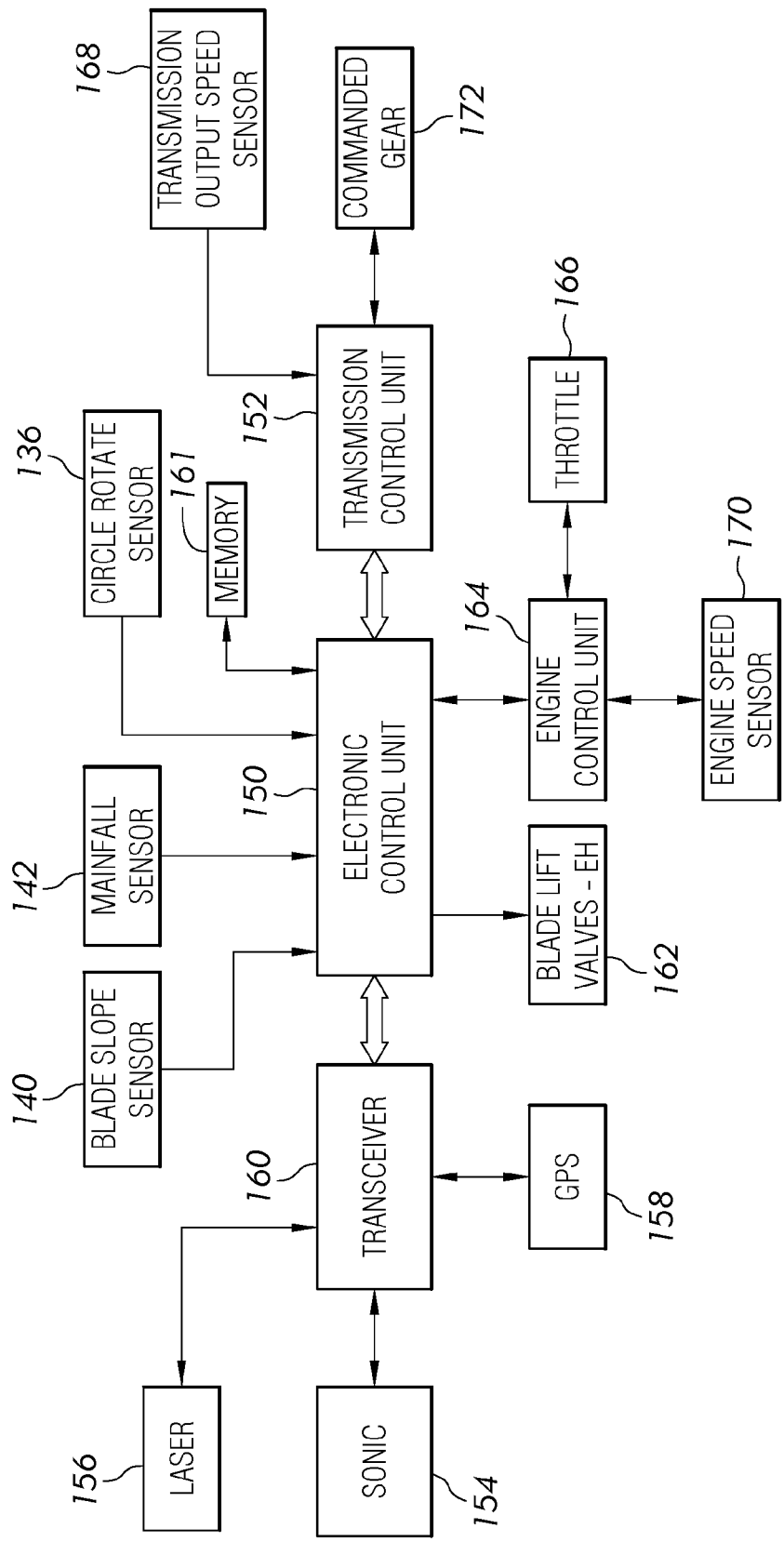
FIG. 2 is a simplified schematic diagram of a vehicle and a vehicle grade control system of the present disclosure.

FIG. 2 is a simplified schematic diagram of the vehicle 100 and a vehicle grade control system embodying the invention. In this embodiment, the controller 138 is configured as an electronic control unit (ECU) 150 operatively connected to a transmission control unit 152. The ECU 150 is located in the cab 110 of vehicle 100 and the transmission control unit 152 is located at the transmission of the vehicle 100. The ECU 150 receives slope, angle, and/or elevation signals generated by one or more types of machine control systems including a sonic system 154, a laser system 156, and a GPS system 158. These signals are collectively identified as contour signals. Each of the machine control systems 154, 156, and 158 communicates with the ECU 150 through a transceiver 160 which is operatively connected to the appropriate type of antenna as is understood by those skilled in the art.

The ECU 150, in different embodiments, includes a computer, computer system, or other programmable devices. In other embodiments, the ECU 150 can include one or more processors (e.g. microprocessors), and an associated memory 161, which can be internal to the processor of external to the processor. The memory 161 can include random access memory (RAM) devices comprising the memory storage of the ECU 150, as well as any other types of memory, e.g., cache memories, non-volatile or backup memories, programmable memories, or flash memories, and read-only memories. In addition, the memory can include a memory storage physically located elsewhere from the processing devices and can include any cache memory in a processing device, as well as any storage capacity used as a virtual memory, e.g., as stored on a mass storage device or another computer coupled to ECU 150. The mass storage device can include a cache or other dataspace which can include databases. Memory storage, in other embodiments, is located in the "cloud", where the memory is located at a distant location which provides the stored information wirelessly to the ECU 150.

The ECU 150 executes or otherwise relies upon computer software applications, components, programs, objects, modules, or data structures, etc. Software routines resident in the included memory of the ECU 150 or other memory are executed in response to the signals received. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user. The ECU 150 is configured to execute the stored program instructions.

The ECU 150 is also operatively connected to a blade lift valves assembly 162 which is in turn operatively connected to the right and left lift linkage arrangements 126 and 128 and the actuator 130. The blade lift valves assembly 162, in one embodiment, is an electrohydraulic (EH) assembly which is configured to raise or lower the blade 132 with respect to the surface or ground and to one end of the blade to adjust the slope of the blade. In different embodiments, the valve assembly 162 is a distributed assembly having different valves to control different positional features of the blade. For instance, one or more valves adjust one or both of the linkage arrangements 126 and 128 in response to commands generated by and transmitted to the valves and generated by the ECU 150. Another one or more valves, in different embodiments, adjusts the actuator 130 in response to commands transmitted to the valves and generated by the ECU 150. The ECU 150 responds to grade status information, provided by the sonic system 154, the laser system 156, and the GPS 158, and adjusts the location of the blade 132 through control of the blade lift valves assembly 162.

To achieve better productivity and to reduce operator error, the ECU 150 is coupled to the transmission control unit 152 to control the amount of power applied to the wheels of the vehicle 100. The ECU 150 is further operatively connected to an engine control unit 164 which is, in part, configured to control the engine speed of the engine 116. A throttle 166 is operatively connected to the engine control unit 164. In one embodiment, the throttle 166 is a manually operated throttle located in the cab 110 which is adjusted by the operator of vehicle 100. In another embodiment, the throttle 166 is additionally a machine controlled throttle which is automatically controlled by the ECU 150 in response to grade information and vehicle speed information.

The ECU 150 provides engine control instructions to the engine control unit 164 and transmission control instruction to the transmission control unit 152 to adjust the speed of the vehicle in response to grade information provided by one of the machine control systems including the sonic system 154, the laser system 156, and the GPS system 158. In other embodiments, other machine control systems are used.

Vehicle speed information is provided to the ECU 150, in part, by the transmission control unit 152 which is operatively connected to a transmission output speed sensor 168. The transmission output speed sensor 168 provides a sensed speed of an output shaft of the transmission, as is known by those skilled in the art. Additional transmission speed sensors are used in other embodiments including an input transmission speed sensor which provides speed information of the transmission input shaft.

Additional vehicle speed information is provided to the ECU 150 by the engine control unit 164. The engine control unit 164 is operatively connected to an engine speed sensor 170 which provides engine speed information to the engine control unit 164.

A current vehicle speed is determined at the ECU 150 using speed information provided by one of or both of the transmission control unit 152 and the engine control unit 164. The speed of the vehicle 100 is increased by speed control commands provided by the ECU 150 when the grade control system is on target to ensure maximum productivity. Likewise, the ECU 150 lowers vehicle speed when a grade control error is above a defined target. The burden on the operator is reduced or even eliminated under certain conditions to automatically adjust the speed of the vehicle 100 to achieve a desired accuracy of the graded surface, while meeting an acceptable productivity target. In different embodiments, vehicle speed is adjusted by controlling the speed of the engine by automatically controlling the throttle 166 with the engine control unit 164 or by controlling the transmission output speed by automatically selecting one of the gears as being a commanded gear 172. Adjustment of the vehicle speed is made in different embodiments by controlling engine speed only, controlling transmission output speed only, or by controlling both engine speed and transmission speed at the same time.

The ECU 150 constantly monitors one or more grade control error signals for slope, angle, and elevation, also known as height, compares the signal(s) to a predetermined and defined reference error value, and adjusts the vehicle speed to maintain the error(s) within a defined range.

In one embodiment, the operator sets a target vehicle speed via an operator adjustable engine cruise controller or with the manual foot/hand throttle 166. In one embodiment, the ECU 150 reduces the speed of the vehicle, as necessary, to maintain the defined grade control accuracy. In another embodiment, the ECU raises the speed of the vehicle, if possible, to maintain the defined grade control accuracy.

Figure 3:
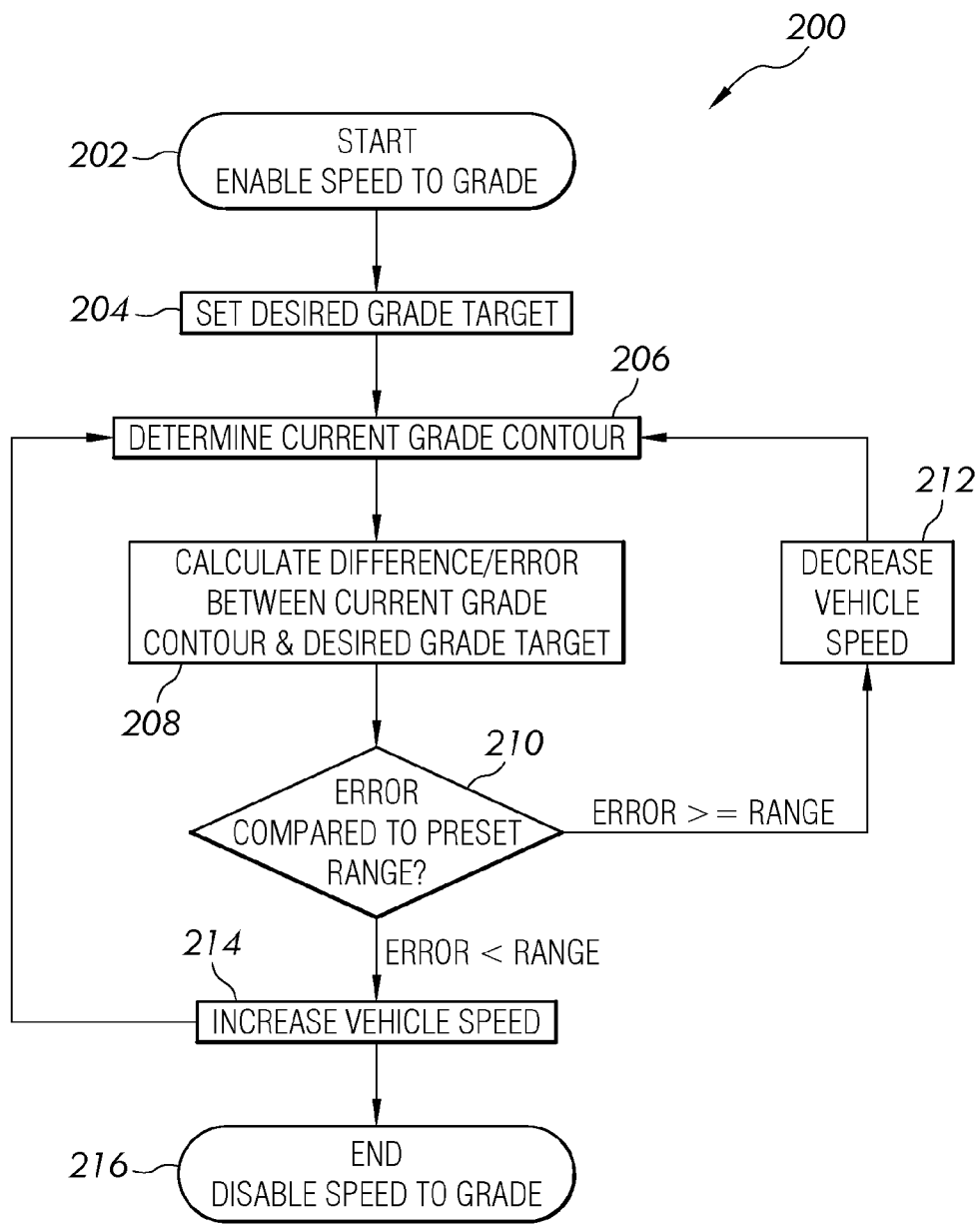
FIG. 3 is a flow diagram of a method to provide automatic speed control of a motor grader.

FIG. 3 illustrates a flow diagram 200 of a method to provide speed control of a vehicle, including a motor grader, in response to a desired slope, angle, and/or elevation provided by a machine control system. Initially, at block 202, the process of providing speed control of the vehicle starts by enabling or selecting a desired speed of the vehicle to grade the surface. In one embodiment, the operator of the vehicle determines a vehicle speed believed to be appropriate for the grading project. The initial speed, in another embodiment, is provided by the ECU 150 which determines an initial speed based on the information received from one of the machine control systems 154, 156, and 158. The determined speed provided by the ECU 150 is displayed at the user interface and used by the operator to manually adjust the vehicle speed to the displayed speed. In another embodiment, the determined speed for the vehicle 100 is automatically adjusted by ECU 150 in combination with the transmission control unit 152 and the engine control unit 170.

Once the enable speed has been set in block 202, a desired grade target is established at block 204. The desired grade target is a grade contour of the surface which can include slope, angle, and elevation. The desired grade target is initially established by operators of the machine control system using predetermined grade targets provided by a contractor, for instance. Once the predetermined grade targets are established, the machine control system is set up to provide grade targets as slope, angle and elevation values, or contour values, which the ECU 150 uses to move the blade 132 to the desired positions to achieve the predetermined grade targets. In another embodiment, the setting of the desired grade target at block 204 is determined before block 202, where the enable vehicle speed to grade is determined.

The machine control system constantly updates the desired grade target based on the location of the vehicle with respect to the surface. The desired grade target, in turn, as constantly updated by the ECU 150, is used to control the position of the blade 132 such that the surface is graded as determined by the machine control system. At block 206, the ECU 150 determines a current grade contour which is provided by the grade system being used to adjust the position of the blade 132. The current grade contour is compared to the desired grade target to provide a difference between the current grade contour and the desired grade target at block 208. This difference value is stored in memory and compared to an error value also stored in memory.

The error value is a predetermined range of acceptable error values which establishes how much of a difference (the error) between the desired grade target and the current grade contour is acceptable. For example, if the surface currently being graded is being graded for a first time, the range of acceptable error values could be any difference of from zero to 10 percent. Other error values are possible. If, however, the surface currently being graded is being graded for a second time after completion of the first grade contour, then the range of acceptable error values could be any difference of from zero to 5 percent. Other error values are possible in the second grade as well.

Once the difference is determined at block 208, the determined difference, which is the determined error value, is compared to a predetermined error value range at block 210. If the determined error value is equal to a value with the range of predetermined error values or is greater than the predetermined range of error values, the vehicle speed is decreased, by decelerating the vehicle, at block 212. If, however, the determined error value is less than the lowest value in the range of error values, then the vehicle speed is increased at block 214, by accelerating the vehicle to a new vehicle speed. In another embodiment, if the determined error value is within a range of acceptable predetermined error values, the vehicle speed is increased to achieve a higher vehicle speed while keeping the determined error value within the range of acceptable predetermined error values. In this embodiment, if the determined error value is greater than the range of acceptable predetermined error values, the speed is decreased.

The predetermined error values are established according to how much error is acceptable. The predetermined error values depend on different factors including the type of material which makes the surface and the final use for which the surface is being graded.

In another embodiment, the new vehicle speed is set to a value to establish the calculated error value to be near a midpoint of the range of predetermined error values. In still another embodiment, the new vehicle speed is set to a value which establishes the calculated error to be near one end of the range of values, such that the highest acceptable speed is set for the vehicle.

In another embodiment, the range of predetermined acceptable error values is replaced by a single predetermined error value. In this embodiment, if the determined error value is greater than the single predetermined error value, the vehicle speed is decreased. If the determined error value is less than the single predetermined error value, the vehicle speed is increased. In this embodiment, if the determined error value is equal to the single predetermined error value, the speed of the vehicle is also decreased. In another embodiment, however, if the determined error value is equal to the single predetermined error value, the speed of the vehicle is also increased. Once grading is complete, the automatic speed control is disabled at block 216.

Vehicle speed is adjusted in different ways and includes adjusting the throttle within a single gear or moving from one gear of the transmission to another gear of the transmission.

Different predetermined error values or different ranges of predetermined error values are used in other embodiments, where the accuracy of the current grade with respect to the desired grade changes over the entire surface. For instance, a surface being graded may have a first area or first portion which requires that the final grade closely meets a predetermined grade. A second area or second portion of the surface being graded may require a final grade that need not be precisely controlled with respect to the desired grade. Under these conditions, the predetermined error value includes determining a first range of error values and a second range of error values each of which is used for a different area of the surface. In one example, the different areas can represent a parking lot area which requires more accurate grading when compared to an open field area located adjacently to the parking lot. The first range of error values, in this case, is narrower range of error values, when compared to the second range of error values, which includes a larger range. In other embodiments, different areas of surface are distinguished according to the type of material located within each of the areas.

A disabling of the automatic speed control system, in one embodiment, is made by the operator who determines that the current grading operation should be stopped. In another embodiment, the automatic speed control system is disabled by the ECU 150, which receives a signal from the machine control system indicating that the system speed control system should be disabled. In this embodiment, automatic disabling of the speed control system results from a variety of different conditions which includes the vehicle leaving the receiving field of the signal provided to grade control system, experiencing a blocked signal, or receiving a disable signal provided by the machine control system. In this case the disable signal could be used to positively identify to the ECU 150 that portion of the surface which requires grading has ended.

This disclosure automatically adjusts the vehicle speed higher when the vehicle grading operation is on target to ensure maximum productivity. Likewise, the vehicle grade control system lowers vehicle speed when the grade control error is above a defined target. The vehicle grade control system manages the vehicle speed to achieve accuracy while providing acceptable productivity.

In other embodiments, operator controls, which are located in the cab 110, include an on/off switch to enable the operator to turn on or off the grade control system. In another embodiment, the vehicle grade control system remains in an on state, but the automatic speed control is turned off. The switch is operatively connected to the electronic control unit 150. In other embodiments, the error value or range of error values is set by the operator using an error control device or error adjusting device, such as a slider, a joystick, or graphical user interface. Additional operator controls include display indicators which show the operator whether the vehicle speeds is operating within the predetermined speed range. For instance, a green light indicates that the vehicle speed is acceptable and a yellow light indicates that the vehicle speed is close to being out of an acceptable range. In this way the operator can reduce or prevent system errors by monitoring the condition of the control system.

In different embodiments, the selection of the predetermined range of error values is made for reasons other than being merely based on grade control with respect to the predetermined grade. For instance, the predetermined range of error values is selected in different embodiments to slow down the vehicle to reduce vehicle bouncing, to accommodate operator comfort, and the distinguish between an experienced or an inexperienced operator. In still other embodiments, the automatic adjustment of the speed based on the grade error is continuously updated to reflect changes in surface conditions and materials.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling a speed of a grading vehicle during a grading operation to grade a surface to a desired grade, comprising:
    establishing a grade target to establish the desired grade of the surface;
    identifying a current grade of the surface;
    identifying an error value between the grade target and the identified current grade of the surface;
    increasing the speed of the grading vehicle if the identified error value is within an error value range; and
    decreasing the speed of the grading vehicle if the identified error value is not within an error value range.

2. The method of claim 1 further comprising:
    identifying an acceleration value of the grading vehicle, wherein the increasing the speed of the grading vehicle includes increasing the speed of the grading vehicle based on the identified acceleration value.

3. The method of claim 2 further comprising:
    identifying a deceleration value of the grading vehicle, wherein the decreasing the speed of the grading vehicle includes decreasing the speed of grading vehicle based on the identified deceleration value.

4. The method of claim 3 wherein the identifying an error value includes identifying a first error value between the grade target and the identified current grade of the surface and a second error value between the grade target and the identified current grade of the surface.

5. The method of claim 4 wherein the increasing the speed of the grading vehicle includes increasing the speed of the grading vehicle based on the first error value during a first portion of the grading operation and increasing the speed of the grading vehicle based on the second error value during a second portion of the grading operation.

6. The method of claim 4 wherein the decreasing the speed of the grading vehicle includes decreasing the speed of the grading vehicle based on the first error value during a first portion of the grading operation and decreasing the speed of the grading vehicle based on the second error value during a second portion of the grading operation.

7. The method of claim 5 further comprising providing an operator adjustable control having a first state adapted to select the first error value and a second state adapted to select the second error value.

8. The method of claim 1 wherein the identifying a current grade of the surface includes identifying one of a slope and an elevation of the surface.

9. The method of claim 1 wherein the identifying a current grade of the surface includes identifying a current grade as a result of grade information provided by one of a two-dimensional cross slope system and a three-dimensional grade control system.

10. The method of claim 1 wherein the increasing the speed includes increasing the speed of the grading vehicle if the identified error value is within the error value range to thereby adjust the error value to be equal to approximately the established grade target.

11. The method of claim 1 wherein the decreasing the speed of the grading vehicle if the identified error value is not within the error value range includes decreasing the speed of the grading vehicle to thereby adjust the error value to be equal to approximately the established grade target.

12. A vehicle grade control system for a vehicle having wheels, a frame, a grader blade configured to move through a range of positions with respect to the frame, and an engine supported by the frame to move the vehicle at a requested speed, and a transmission having a plurality of selectable gears operatively connected to the engine and to the wheels, the control system comprising:
    a throttle having a throttle output, the throttle operatively connected to the engine to adjust a speed of the engine with the throttle output;
    control circuitry operatively connected to the throttle, the control circuitry including a processor and a memory, wherein the memory is configured to store program instructions and the processor is configured to execute the stored program instructions to:
        identify a current grade of the surface;
        identify an error value between a grade target and the identified current grade of the surface;
        increase the speed of the vehicle with the throttle output or by selecting a gear of the transmission if the identified error value is within an error value range; and
        decrease the speed of the vehicle with the throttle output or by selecting a gear of the transmission if the identified error value is not within an error value range.

13. The control system of claim 12 wherein the processor is further configured to:
    identify an acceleration value of the grading vehicle, wherein the increasing the speed of the grading vehicle includes increasing the speed of the grading vehicle based on the identified acceleration value.

14. The control system of claim 13 wherein the processor is further configured to:
    identify a deceleration value of the grading vehicle, wherein the decreasing the speed of the grading vehicle includes decreasing the speed of grading vehicle based on the identified deceleration value.

15. The control system of claim 14 wherein the processor is further configured to:
    identify an error value includes identifying a first error value between the grade target and the identified current grade of the surface and a second error value between the grade target and the identified current grade of the surface.

16. The control system of claim 15 wherein the processor is further configured to:
increase the speed of the grading vehicle based on the first error value during a first portion of the grading operation and increasing the speed of the grading vehicle based on the second error value during a second portion of the grading operation.

17. The control system of claim 16 wherein the processor is further configured to:
decrease the speed of the grading vehicle based on the first error value during a first portion of the grading operation and decreasing the speed of the grading vehicle based on the second error value during a second portion of the grading operation.

18. The control method of claim 17 further comprising an operator adjustable control having a first state adapted to select the first error value and a second state adapted to select the second error value.

19. A method of controlling a speed of a grading vehicle during a grading operation to grade a surface to a desired grade, comprising:
identifying a current grade of the surface;
identifying an error value between a grade target and the identified current grade of the surface;
increasing the speed of the grading vehicle if the identified error value is within an error value range; and
decreasing the speed of the grading vehicle if the identified error value is outside the error value range.

20. The method of claim 19 further comprising identifying the error value in response to an error adjusting device having a value determined by an operator of the grading vehicle.

* * * * *